United States Patent
Khanna et al.

(10) Patent No.: US 9,646,293 B2
(45) Date of Patent: May 9, 2017

(54) IN SESSION CHARGING NOTIFICATIONS AND RECHARGING ACCOUNTS

(71) Applicant: Microsoft Technology Licensing, LLC, Redmond, WA (US)

(72) Inventors: Nitin Khanna, Palo Alto, CA (US); Aarne Laur, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 646 days.

(21) Appl. No.: 13/804,170

(22) Filed: Mar. 14, 2013

(65) Prior Publication Data

US 2014/0269436 A1 Sep. 18, 2014

(51) Int. Cl.
| | | |
|---|---|---|
| G06Q 20/08 | (2012.01) | |
| G06Q 20/12 | (2012.01) | |
| H04M 15/00 | (2006.01) | |
| H04M 17/00 | (2006.01) | |
| H04L 12/14 | (2006.01) | |
| H04W 4/14 | (2009.01) | |

(52) U.S. Cl.
CPC ....... *G06Q 20/127* (2013.01); *H04L 12/1417* (2013.01); *H04M 15/8228* (2013.01); *H04M 15/84* (2013.01); *H04M 15/852* (2013.01); *H04M 15/88* (2013.01); *H04M 15/882* (2013.01); *H04M 17/20* (2013.01); *H04M 17/202* (2013.01); *H04M 17/204* (2013.01); *H04L 12/1467* (2013.01); *H04M 2215/28* (2013.01); *H04W 4/14* (2013.01)

(58) Field of Classification Search
None
See application file for complete search history.

(56) References Cited

U.S. PATENT DOCUMENTS

| | | | |
|---|---|---|---|
| 6,487,401 B2* | 11/2002 | Suryanarayana et al. | 455/406 |
| 7,242,922 B2 | 7/2007 | Fieldhouse et al. | |
| 7,957,720 B2* | 6/2011 | Mumford | H04M 15/00 379/114.01 |
| 7,991,131 B2 | 8/2011 | Bartter et al. | |
| 8,509,404 B2* | 8/2013 | Foster | H04M 15/83 379/114.2 |
| 2008/0057917 A1* | 3/2008 | Oria | 455/414.1 |
| 2009/0145972 A1* | 6/2009 | Evans | 235/492 |

OTHER PUBLICATIONS

"Business Terms of Use", Retrieved at <<http://www.skype.com/en/legal/business-tou/>>, In Skype Legal Business Terms, Retrieved Date: Mar. 13, 2013, pp. 28.

"Comviva's Next Generation PreTUPST Dominates Mobile Prepaid Recharge Market across the Globe", Retrieved at <<http://www.comviva.com/media/Comviva-Next-Generation-PreTUPS-Dominates-Mobile-Prepaid-Recharge-Market-across-the-Globe.htm>>, Jan. 17, 2013, pp. 3.

(Continued)

*Primary Examiner* — Alex Skripnikov

(57) ABSTRACT

Various embodiments provide a subscription management service, which can be in-band or out-of-band, which allows users to extend their subscription or temporarily side-step payment limits on a subscription without disrupting the user's experience. The various embodiments can be operable in all on-demand services including, but not limited to, video services, voice services, video/voice services, text services, Web services, and the like.

20 Claims, 7 Drawing Sheets

(56) References Cited

OTHER PUBLICATIONS

Nigel., "How do I Set up Auto Recharges on My Prepaid Mobile Service?", Retrieved at <<https://community.virginmobile.com.au/t5/General-knowledge-base/How-do-i-set-up-auto-recharges-on-my-Prepaid-mobile-service/ta-p/840>>, Retrieved Date: Mar. 13, 2013, pp. 5.

"Account Management", Retrieved at http://www.fido.ca/web/content/account/low_insufficient_balance_impacts, Retrieved Date: Mar. 13, 2013, p. 1.

"Low Balance Notifications", Retrieved at https://trac.sippysoft.com/trac/wiki/public/Softswitch/Low_Balance_Notifications#LowBalanceNotifications>>, Retrieved Date: Mar. 13, 2013, pp. 2.

* cited by examiner

IN SESSION CHARGING NOTIFICATIONS AND RECHARGING ACCOUNTS

BACKGROUND

Often, service providers offer users the various options such as purchasing pre-paid plans or placing limits on the usage of their accounts to allow users to better manage their subscriptions. Such approaches can be used in scenarios including telephony, video on demand, and the like. Although this can be a very powerful feature, it is often limited in scenarios such as those that include a user wishing to consciously extend or sidestep the budgeted amount.

As of today, a typical user experience for a telephony user would involve an announcement played back during the pendency of the user's call informing the user that their credit will expire after which the call will be disconnected.

This can be quite inconvenient for a user, particularly when the user is willing to pay an additional amount for continued use of the service.

SUMMARY

This Summary is provided to introduce a selection of concepts in a simplified form that are further described below in the Detailed Description. This Summary is not intended to identify key features or essential features of the claimed subject matter.

Various embodiments provide a subscription management service, which can be in-band or out-of-band, which allows users to extend their subscription or temporarily side-step payment limits on a subscription without disrupting the user's experience. The various embodiments can be operable in all on-demand services including, but not limited to, video services, voice services, video/voice services, text services, Web services, and the like.

In accordance with the various approaches, users can extend or customize their service subscription, while using the service, without degradation, suspension, or termination of their service experience.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments provide a subscription management service, which can be in-band or out-of-band, which allows users to extend their subscription or temporarily side-step payment limits on a subscription without disrupting the user's experience. The various embodiments can be operable in all on-demand services including, but not limited to, video services, voice services, video/voice services, text services, Web services, and the like.

In accordance with the various approaches, users can extend or customize their service subscription, while using the service, without degradation, suspension, or termination of their service experience.

In operation, the subscription management service provides an infrastructure around various services that enables users to extend the use of the service and/or temporarily ignore imposed monetary limits. In one or more embodiments, service extension opportunities can be provided to the user while they are participating in the service without disrupting their current service session. This can be particularly useful in scenarios where expiration of a particular service is reached in the middle of an existing session, such as the typical pre-paid service scenario or service scenarios in which a user has pre-established monetary limits.

As an example, in various embodiments when a user's credit is about to expire, the user is presented with an announcement or some other notification. The user, acting on the announcement or notification, can take measures to prevent their credit from expiring through either in-band and/or out-of-band techniques which can temporarily or permanently recharge an associated account by a specified amount. The in-band and out-of-band techniques can include, by way of example and not limitation, dialing into a number, providing input via keys on a keypad, sending an SMS message during service consumption, and the like. For non-telephony scenarios, such as video-on-demand, service providers can also utilize supplementary applications on, for example, mobile devices, to notify users of charging events and subsequent payments.

In the discussion that follows, a section entitled "Example Environment" describes an example environment in which the various embodiments can be utilized. Next, a section entitled "Example Activity Diagram" describes an example activity diagram in accordance with one or more embodiments. Following this, a section entitled "Example User Interfaces" describes example user interfaces in accordance with one or more embodiments. Last, a section entitled "Example System" describes an example system and various devices that can be utilized to implement one or more embodiments.

Consider now an example environment in which various embodiments can be practiced.

Example Environment

Figure 1:
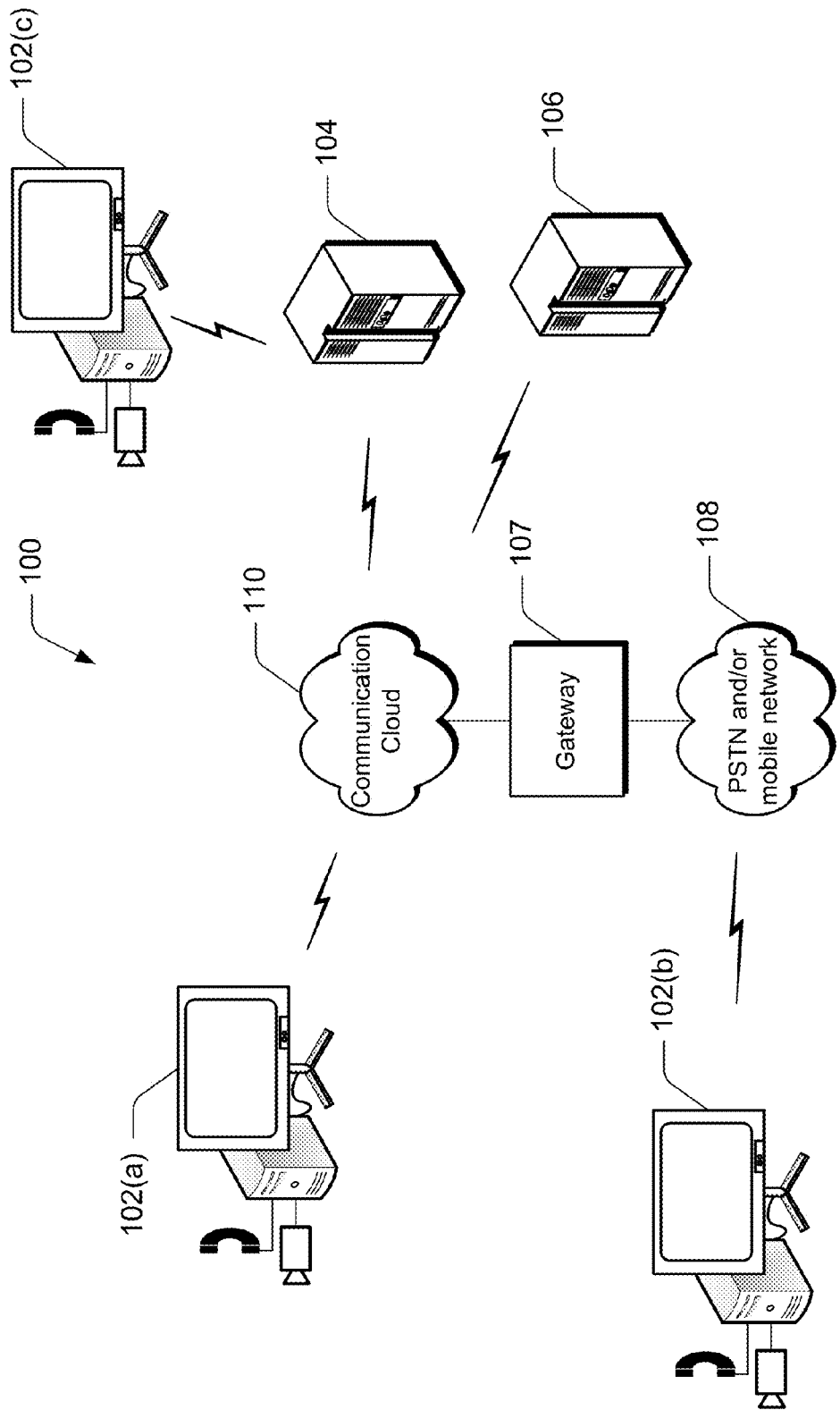
FIG. 1 is an illustration of an environment in an example implementation that is operable to perform the various embodiments described herein.

FIG. 1 is a schematic illustration of a communication system 100 which, in at least some embodiments, can be implemented over a packet-based network, here represented by communication cloud 110 in the form of the Internet, comprising a plurality of interconnected elements. In this example, each network element may be connected to the rest of the Internet, and is configured to communicate data with other such elements over the Internet by transmitting and receiving data in the form of Internet Protocol (IP) packets. Alternately or additionally, networks other than the Internet can be utilized. For example, PSTN can route calls via non-IP protocols. In addition, calling can take place within private networks rather than the Internet. In at least some embodiments, each element also has an associated IP address locating it within the Internet, and each packet includes a source and destination IP address in its header. The elements shown in FIG. 1 include a plurality of end-user terminals 102(a), 102(b), and 102(c) such as desktop or laptop PCs or Internet-enabled mobile phones, a server 104, such as a peer-to-peer server of an Internet-based communication system or a traditional server configured to enable client/server communication, a server 106 that supports or otherwise implements a subscription management service as described above and below, and a gateway 107 to another type of network 108, such as to a traditional Public-Switched Telephone Network (PSTN) or other circuit switched network, and/or to a mobile cellular network. However, it will of course be appreciated that many more elements make up the Internet than those explicitly shown. This is represented schematically in FIG. 1 by the communications cloud 110 which typically includes many other end-user terminals, servers and gateways, as well as routers of Internet service providers (ISPs) and Internet backbone routers.

In various embodiments, the subscription management service offered by server 106 allows users to extend their subscription or temporarily side-step payment limits on a subscription without disrupting the user's experience. The various embodiments can be operable in all on-demand services including, but not limited to, video services, voice services, video/voice services, text services, Web services, and the like. In accordance with the various approaches, users can extend or customize their service subscription, while using the service, without degradation, suspension, or termination of their service experience.

In operation, the subscription management service provides an infrastructure around various services that enables users to extend the use of the service and/or temporarily ignore imposed monetary limits. In one or more embodiments, service extension opportunities can be provided to the user while they are participating in the service without disrupting their current service session. This can be particularly useful in scenarios where expiration of a particular service is reached in the middle of an existing session, such as the typical pre-paid service scenario or service scenarios in which a user has pre-established monetary limits.

In the illustrated and described embodiment, end-user terminals 102(a) to 102(c) can communicate with one another, as well as other entities, by way of the communication cloud using any suitable techniques. Thus, end-user terminals can communicate through the communication cloud 110, through the communication cloud 110, gateway 107 and network 108, or through server 104 using, for example Voice over IP (VoIP).

In at least some instances, in order to communicate with another end user terminal, a client executing on an initiating end user terminal acquires the IP address of the terminal on which another client is installed. This can be done using an address look-up or any suitable technique.

Some Internet-based communication systems are managed by an operator, in that they rely on one or more centralized, operator-run servers for address look-up (not shown). In that case, when one client is to communicate with another, then the initiating client contacts a centralized server run by the system operator to obtain the callee's IP address. Other approaches can be utilized. For example, in some server-based systems, call requests are received by the server and media is relayed by the server. In this instance, there is not an end-to-end connection between the clients, but rather a server in between for the communication that takes place.

In contrast to these operator managed systems, another type of Internet-based communication system is known as a "peer-to-peer" (P2P) system. Peer-to-peer (P2P) systems typically devolve responsibility away from centralized operator servers and into the end-users' own terminals. This means that responsibility for address look-up is devolved to end-user terminals like those labeled 102(a) to 102(c). Each end user terminal can run a P2P client application, and each such terminal forms a node of the P2P system. P2P address look-up works by distributing a database of IP addresses amongst some of the end user nodes. The database is a list which maps the usernames of all online or recently online users to the relevant IP addresses, such that the IP address can be determined given the username. The above constitutes but an example only. It is to be appreciated and understood that other approaches can be utilized without departing from the spirit and scope of the claimed subject matter. For example, some systems can utilize multiple IP addresses or utilize URIs which have DNS names.

Once known, the address allows a user to establish a voice or video call, or send an instant message (IM) chat message or file transfer, etc. Additionally however, the address may also be used when the client itself needs to autonomously communicate information with another client.

Figure 2:
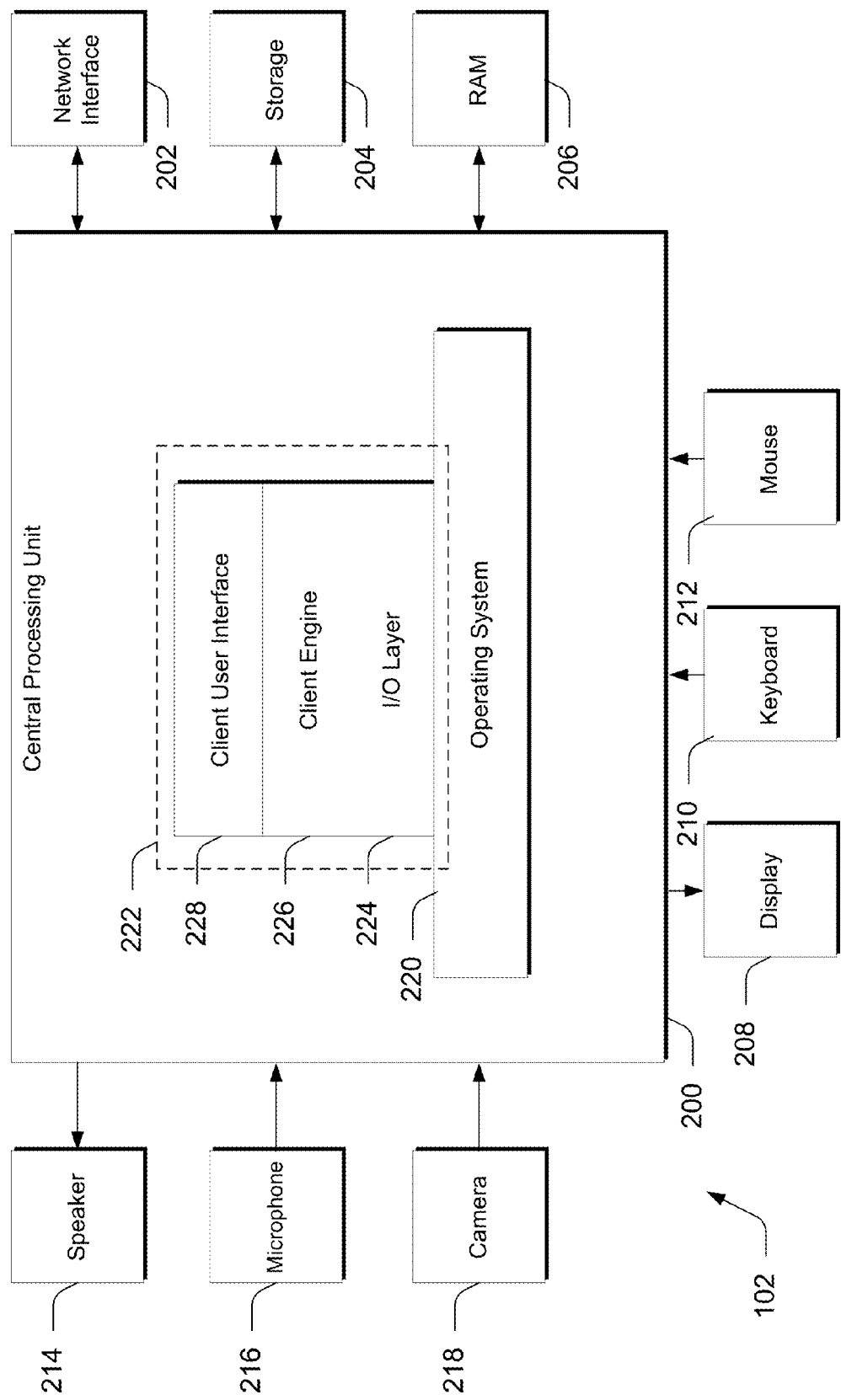
FIG. 2 illustrates an example client architecture in accordance with one or more embodiments.

The schematic block diagram of FIG. 2 shows an example of an end-user terminal 102 which is configured to act as a terminal of a system operating over the Internet. The system may comprise a P2P system and/or a non-P2P system and may use one or more different protocols to communicate. The terminal 102 comprises a processor or CPU 200 operatively coupled to: a network interface 202 such as modem or other interface for connecting to the Internet, a non-volatile storage device 204 such as a hard-drive or flash memory, and a volatile memory device such as a random access memory (RAM) 206. The terminal 102 also comprises one or more user input devices, for example in the form of a keyboard or keypad 210, a mouse 212, a microphone 216 and a camera 218 such as a webcam, each operatively coupled to the CPU 200. The terminal 102 further comprises one or more user output devices, for example in the form of a display 208 and speaker 214, again each operatively coupled to the CPU 200.

The storage device 204 stores software including at least an operating system (OS) 220, and packet-based communication software in the form of a client application 222 which may comprise a P2P application and/or a non-P2P application through which communication can take place over a network, such as the networks described in FIG. 1. On start-up or reset of the terminal 102, the operating system 220 is automatically loaded into the RAM 206 and from there is run by being executed on the CPU 200. Once running, the operating system 220 can then run applications, such as the client application 222, by loading them into the into the RAM 206 and executing them on the CPU 200. To represent this schematically in FIG. 2, the operating system 220 and client application 222 are shown within the CPU 200.

In this particular non-limiting example, the client application 222 comprises a "stack" having three basic layers: an input and output (I/O) layer 224, a client engine layer 226, and a client user interface (UI) layer 228. The functionality of these layers can be implemented by an architecture other than the one specifically depicted without departing from the spirit and scope of the claimed subject matter.

Each layer or corresponding functionality module is responsible for specific functions. Because each successive layer usually communicates with two adjacent layers (or one in the case of the top layer), they are regarded as being arranged in a stack as shown in FIG. 2. The client application 222 is said to be run "on" the operating system 220. This means that in a multi-tasking environment it is scheduled for execution by the operating system 220; and further that inputs to the lowest (I/O) layer 224 of the client application 222 from network interface 202, microphone 216 and camera 218 as well as outputs from the I/O layer 224 to network interface 202, display 208 and speaker 214 may be mediated via suitable drivers and/or APIs of the operating system 220. In at least some embodiments, the client application 222 can be implemented to include a web-based interface that can be utilized to present audiovisual and interactive content.

The I/O layer 224 of the client application comprises a voice engine and optionally a video engine in the form of audio and video codecs which receive incoming encoded streams and decodes them for output to speaker 214 and/or display 208 as appropriate, and which receive unencoded audio and/or video data from the microphone 216 and/or camera 218 and encodes them for transmission as streams to other end-user terminals 102 of a P2P system, or other entities in a PSTN and/or mobile network such as network 108. The I/O layer 224 may also comprise a control signaling protocol for signaling control information between terminals 102 of the network.

The client engine layer 226 then handles the connection management functions of the system as discussed above, such as establishing calls or other connections by P2P address look-up and authentication, as well as by other techniques. The client engine may also be responsible for other secondary functions of the system such as supplying up-to-date contact lists and/or avatar images of the user to the server 104 (FIG. 1); or retrieving up-to-date contact lists of the user and retrieving up-to-date avatar images of other users from the server 104.

The client user interface layer 228 is responsible for presenting decoded content, such as audiovisual and/or interactive content to the user via the display 208, for presenting the output on the display 208 along with other information such as presence and profile information and user controls such as buttons and menus, and for receiving inputs from the user via the presented controls.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the end user terminal 102 may also include an entity (e.g., software) that causes hardware or virtual machines of the end user terminal 102 to perform operations, e.g., processors, functional blocks, and so on. For example, the end user terminal 102 may include a computer-readable medium that may be configured to maintain instructions that cause the end user terminal, and more particularly the operating system and associated hardware of the end user terminal 102 to perform operations. Thus, the instructions function to configure the operating system and associated hardware to perform the operations and in this way result in transformation of the operating system and associated hardware to perform functions. The instructions may be provided by the computer-readable medium to the end user terminal 102 through a variety of different configurations.

One such configuration of a computer-readable medium is signal bearing medium and thus is configured to transmit the instructions (e.g., as a carrier wave) to the end user terminal, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having considered an example operating environment in accordance with one or more embodiments, consider now a discussion of an example activity diagram in accordance with one or more embodiments.

Example Activity Diagram

Figure 3:
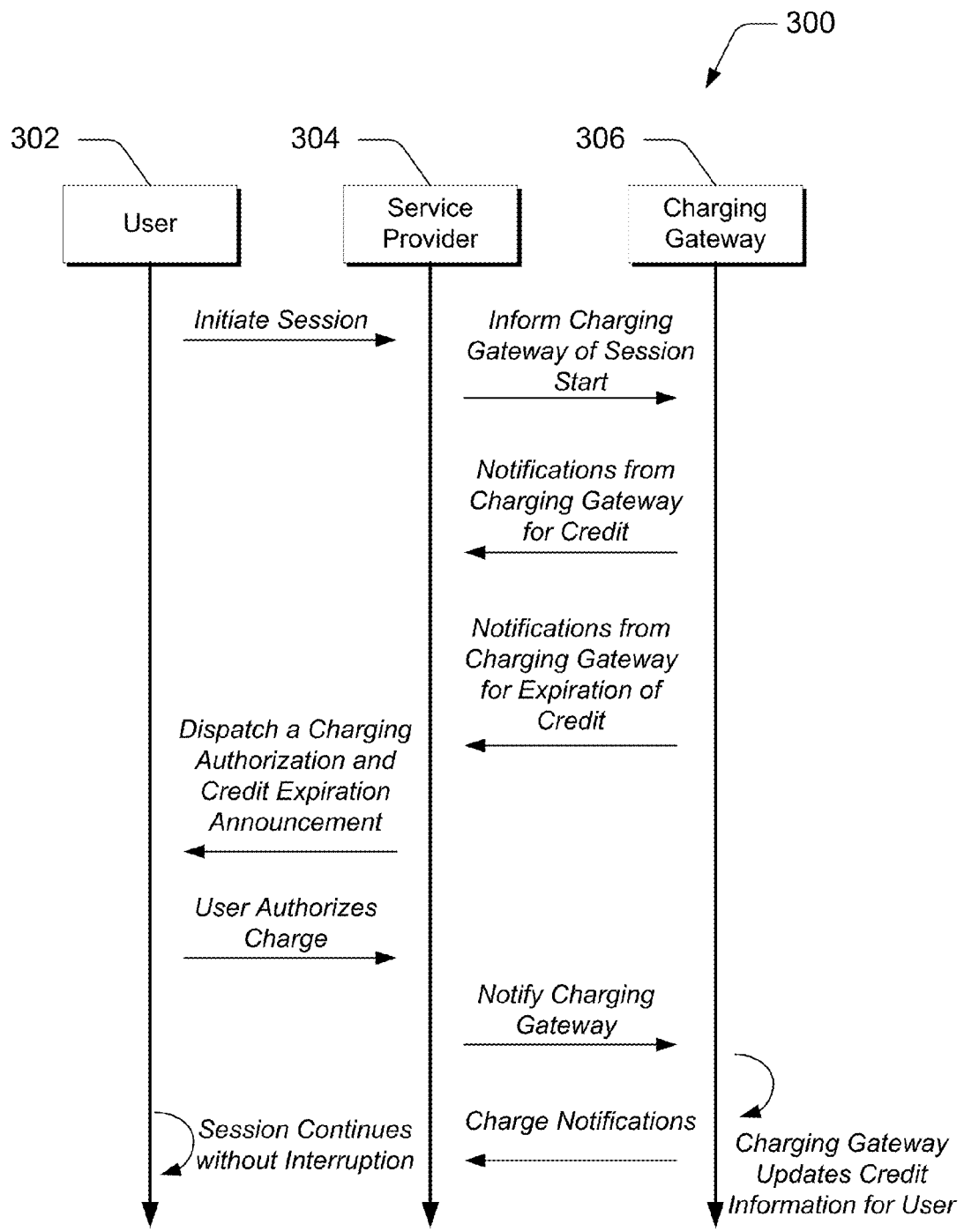
FIG. 3 illustrates an example activity diagram in accordance with one or more embodiments.

FIG. 3 illustrates an example activity diagram in accordance with one or more embodiments, generally at 300. In this activity diagram, three entities are illustrated—a user 302, a service provider 304, and a charging gateway 306. In the illustrated and described example, service provider 304 can comprise any suitable type of service provider that provides any suitable type of service, examples of which are provided above. Charging gateway 306 represents an entity that is responsible for maintaining credit information for various users such as user 302 with respect to services that they consume through service provider 304. Although the charging gateway 306 is shown as an entity separate from service provider 304, such need not be the case. Specifically, the charging gateway 306 can constitute part of service provider 304. In the particular example about to be described, a user's credit is monitored by a remote, third-party entity which, in this case, is the charging gateway 306. In other embodiments, a user's credit can be monitored locally, by a suitably-configured client application an example of which is provided below.

In the activity diagram, starting at the top and working down, a user first initiates a service session with service provider 304. In this example, it is assumed that the user maintains a pre-paid account for the service sessions and/or has some type of monetary limit that governs their service account. Any suitable type of service session can be initiated by the user. For example, service sessions can include those associated with any suitable type of on-demand service including, by way of example and not limitation, video services, voice services, video/voice services, text services, Web services, and the like. The voice services and video/voice services can include those associated with making calls over a network such as those networks described above.

When the service provider 304 receives the session initiation notification, it informs the charging gateway 306 of the start of the new session. This enables the charging gateway 306 to check for credit information associated with the user so that it can then return a notification to the service provider 304 indicating whether the user has adequate credit for the service session. Assuming the user has adequate credit for the service session, the service session can be started.

During the pendency of the service session, such as during a communication call or other consumption-related activity associated with the on-demand services, the charging gateway 306 can monitor the user's credit and can notify the service provider 304 in the event the user's credit is to expire within a given time period. When the service provider 304 receives the notification of credit expiration from the charging gateway 306, it dispatches a charging authorization and credit expiration announcement to the user 302. This can be done in any suitable way. For example, a client application executing on the user's client device and through which they are participating in the service session, can receive the charging authorization and credit expiration announcement and, through a suitably-configured user interface, provide the announcement to the user. This can be considered as an in-band notification. In the illustrated and described embodiment, this can be done without meaningfully impacting the service session in which the user is participating while, at the same time, not informing the other participants of the transaction. In other embodiments, out-of-band notifications can be utilized. For example, assume that a user is participating in an on-line telephone call using their desktop computer. Responsive to their session credit falling below a certain threshold, a text message or e-mail message can be generated by the service provider 304 and sent to the user's handheld device cell phone, or a different application on the user's desktop computer. Examples of suitable user interfaces are provided below.

Responsive to receiving the charging authorization and credit expiration announcement, and during the pendency of the service session, the user can authorize charges to their account and/or otherwise indicate that they wish for the service session to continue. Authorization by the user can be through in-band methods or through out-of-band methods. For example, an in-band method may involve responding by way of a user interface presented by the client application through which the user is participating in the service session. An out-of-band method may involve the user responding to the service provider 304 using a different mode of communication then that being used by the current service session.

In addition, with respect to credit authorizations provided by the user, consider the following. In at least some embodiments, the credit authorization provided by the user can be such that it permits the current session to complete without extending additional, unused credit. In this instance, the user can provide authorization for credit extension which, is subsequently billed or charged to the user when the session completes and the service provider ascertains how long the session took. This approach constitutes a post-paid approach in which the user pays for session that already completed. Alternately or additionally, the credit authorization provided by the user can be such that it not only permits the current session to complete, but provides additional, unused credit for subsequent sessions. By providing additional, unused credit for subsequent sessions, this approach constitutes one that includes a pre-paid approach insofar as enabling the user to pre-pay for sessions yet to be used. In addition, in at least some embodiments the pre-paid approach can include not only enabling the user to authorize credit for subsequent sessions, but pre-paid service packages can be offered as well. For example, the user may be presented with options to enroll in different services.

Once the service provider 304 receives the user's authorization charge, the service provider 304 can notify the charging gateway 306 that the user has authorized a credit payment and/or otherwise wishes for the service session to continue. The charging gateway can then update the credit information for the user and generate a charge notification for the service provider.

In this manner, the user's service session can continue without interruption.

Figure 4:
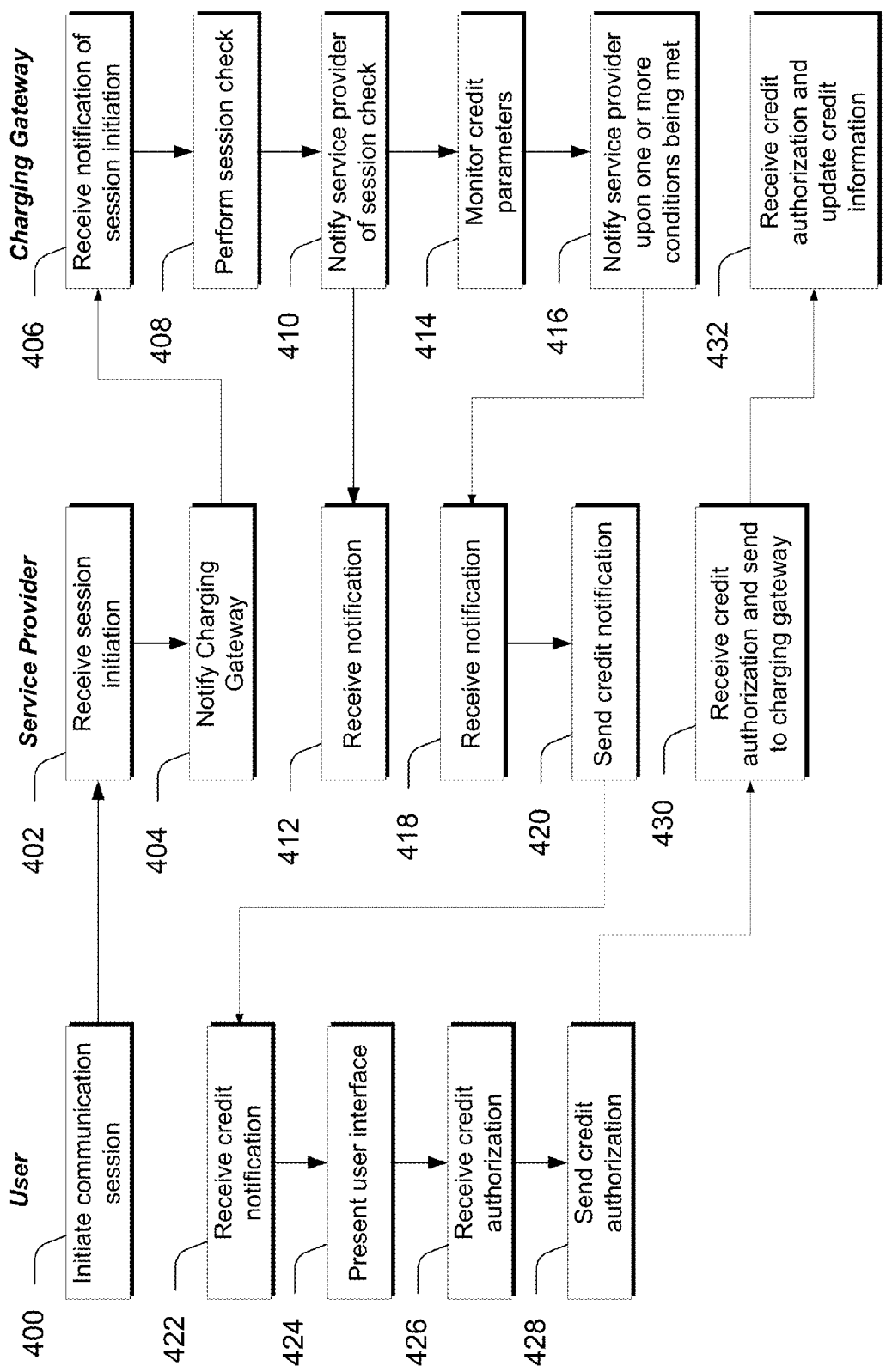
FIG. 4 is a flow diagram that describes steps in a method in accordance with one or more embodiments.

FIG. 4 is a flow diagram that describes steps in a method in accordance with one or more embodiments. The method can be performed in connection with any suitable hardware, software, firmware, or combination thereof. In at least some embodiments, the method is performed by suitably-configured software. In this particular example, aspects of the method are shown to be performed by or on behalf of three different entities—a user, a service provider, and a charging gateway. With respect to the user, the method can be performed by a suitably-configured client application, such as one described above.

Step 400 initiates a communication session. This step can be performed in any suitable way. For example, in at least some embodiments this step can be performed utilizing a client application in a manner that enables a user to place a call, or send an SMS message or email to one or more recipients. In this example, the user typically maintains an account that has a pre-paid amount or credit for the communication sessions.

Step 402 receives the session initiation from the client application. Upon receiving the session initiation, the service provider can take the usual steps to place the call or establish the communication session. Step 404 notifies the charging gateway of the start of the communication session.

At step 406, the charging gateway receives notification of the session initiation and step 408 performs one or more session checks. For example, a session check can include checking to ascertain whether the user has an appropriate amount of credit for the communication session. In addition, the session check can include ascertaining whether the user's credit is at or near a threshold value that would imply expiration of credit during the communication session. Responsive to performing the session check, step 410 notifies the service provider of the session check and the information ascertained during performance thereof. For example, the charging gateway can notify the service provider of the user's credit information to permit the service provider to establish the communication session.

At step 412, the service provider receives the notification of the session check and can take any appropriate actions, such as establishing the communication session.

At step 414, the charging gateway monitors credit parameters associated with the established communication session. This can include ensuring that the user has the appropriate amount of credit to continue the communication session. It is noted that the client application can, alternately or additionally, monitor the credit parameters and notify the service provider as described in the next step (and further in the example of FIG. 5. Step 416 notifies the service provider upon one or more conditions being met. Conditions can include, by way of example and not limitation, the user's credit reaching a particular threshold, the user's credit expiring, and the like.

Step 418 receives the notification from the charging gateway and step 420 sends a credit notification to the user by way of the client application.

Step 422 receives the credit notification and step 424 presents a user interface to the user to inform the user of the credit information included in the credit notification. The user interface, an example of which is provided below, can also provide a mechanism by which the user can extend their credit by adding additional money to their account, elect to change payment options so as to automatically add credit to their account when the credit expires, or perform any other suitable payment function. Step 426 receives credit authorization from the user and step 428 sends the credit authorization to the service provider. It is noted that these operations can be performed during the pendency of the communication session. In this way, a user is able to continue their communication session in an uninterrupted manner while, at the same time, add credit to their account or select a payment option in which credit can be automatically added to their account upon expiration of the credit.

Step 430 receives the credit authorization and sends the credit authorization to the charging gateway for processing.

Step 432 receives the credit authorization and updates the user's credit information.

The above-described method provides a mechanism to notify users of a depleted credit balance or a credit balance that is approaching its account limits while, at the same time, enable users to authorize credit extensions or service registrations/renewals within the scope of the current communication session or call. This can be done without interrupting the communication session or meaningfully degrading the user's experience.

Figure 5:
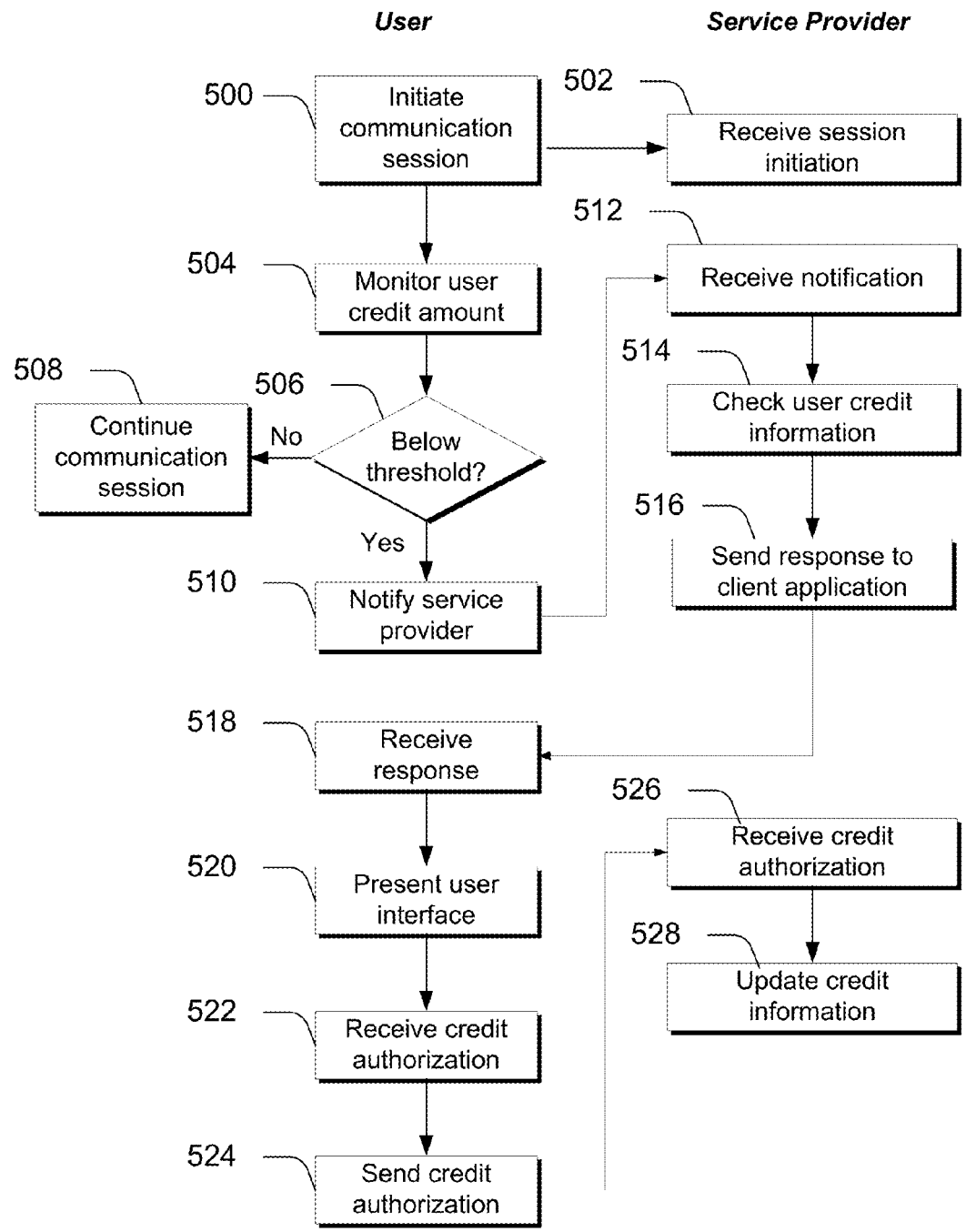
FIG. 5 is a flow diagram that describes steps in a method in accordance with one or more embodiments.

FIG. 5 is a flow diagram that describes steps in a method in accordance with one or more embodiments. The method can be performed in connection with any suitable hardware, software, firmware, or combination thereof. In at least some embodiments, the method is performed by suitably-configured software. In this particular example, aspects of the method are shown to be performed by or on behalf of two different entities—a user and a service provider. With respect to the user, the method can be performed by a suitably-configured client application, such as one described above.

Step 500 initiates a communication session. This step can be performed in any suitable way, examples of which are provided above.

Step 502 receives the session initiation. Responsive to receiving the session initiation, the service provider can establish the communication session. This can be performed in any suitable way.

During the pendency of the communication session, step 504 monitors the user's credit amount with respect to the communication session currently underway. If, at step 506, the user's credit amount is not below a defined threshold, step 508 continues the communication session. If, on the other hand, the user's credit amount is below the defined threshold, then step 510 notifies the service provider. The notification sent to the service provider can include a query as to whether the user is capable of purchasing credit using payment details stored by the service provider. Step 512 receives the notification from the client application and step 514 checks the user's credit information to ascertain whether credit extensions are authorized. Step 516 sends a response to the client application. This response can include an indication that the user has authorized credit extensions.

Step 518 receives the response from the service provider and step 520 presents a user interface that enables the user to extend their credit. Any suitable type of user interface can be provided, an example of which is described just below. Step 522 receives credit authorization by way of the user interface. Step 524 sends the credit authorization to the service provider.

Step 526 receives the credit authorization from the user and step 528 updates the user's credit information.

The above-described method provides a mechanism to notify users of a depleted credit balance or a credit balance that is approaching its account limits while, at the same time, enable users to authorize credit extensions or service registrations/renewals within the scope of the current communication session or call. This can be done without interrupting the communication session or meaningfully degrading the user's experience.

Having described example methods in accordance with one or more embodiments, consider now an example user interface that can be provided in accordance with one or more embodiments.

Example User Interfaces

Figure 6:
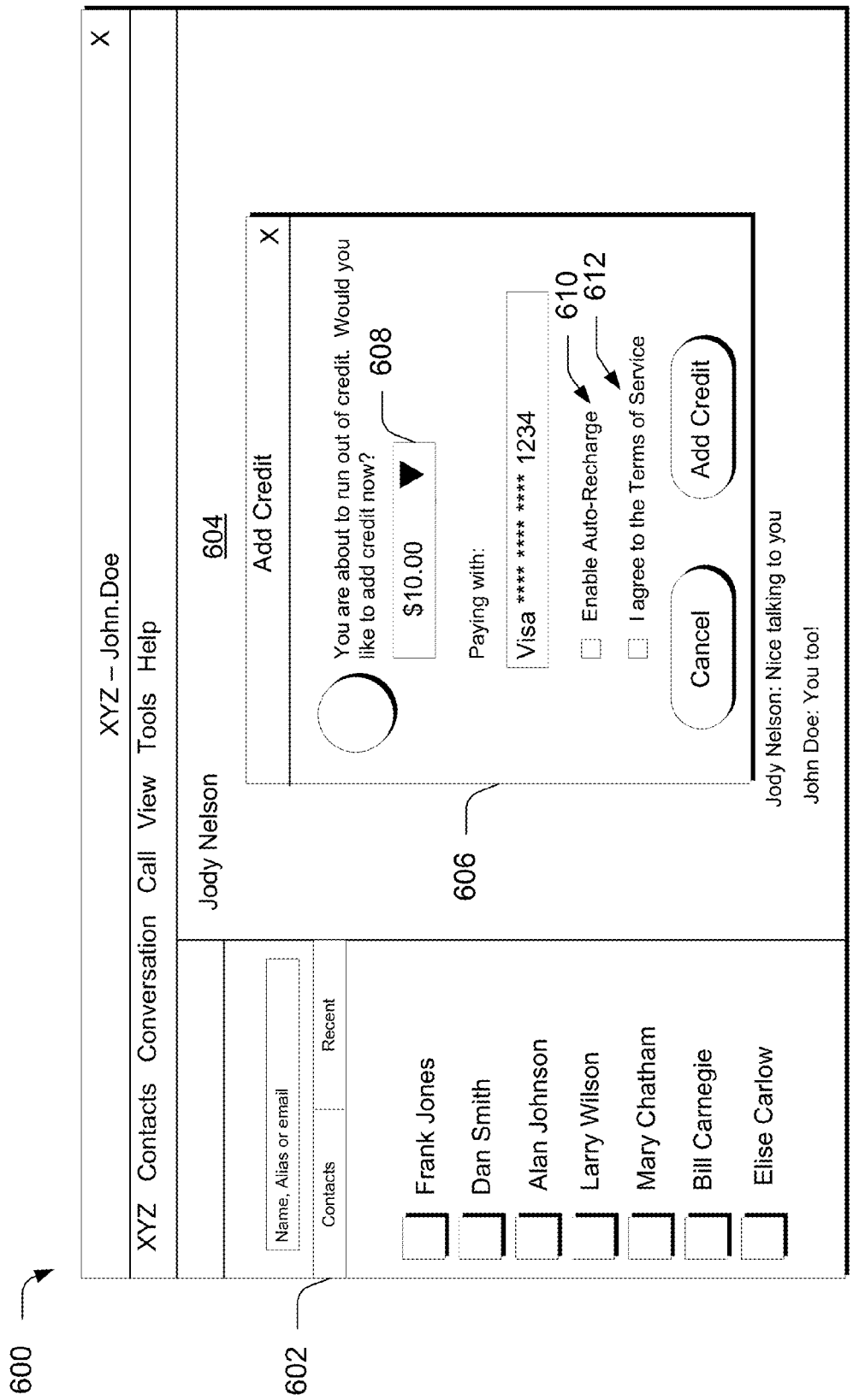
FIG. 6 illustrates an example user interface in accordance with one or more embodiments.

FIG. 6 illustrates an example user interface in accordance with one or more embodiments, generally at 600. In this example, user interface 600 is provided by a suitably-configured client application and enables a user to initiate communication sessions including, by way of example and not limitation, e-mail sessions, voice calls, SMS sessions, and the like. To that end, user interface 600 includes a contacts section 602 that lists the user's contacts. A content portion 604 of the user interface provides the mechanism or means by which the user can participate in the communication session. In this particular example, the user "John Doe" is participating in an SMS session with "Jody Nelson".

Assume that during the user's SMS session, their account credit reaches a pre-determined threshold or is about to run out. As noted above, in one or more embodiments this can be ascertained by the client application. Alternately or additionally, this can be ascertained by a third-party such as a service provider, charging gateway, or similar entity.

In this instance, as described above, a notification in the form of a user interface window 606 can be presented during the pendency of the user's SMS session to inform the user that their credit is about to run out. In this instance, the user interface window 606 includes a prompt informing the user that their credit is about to run out and asking them if they would like to add credit now? If the user wishes to add credit, a menu item 608 enables them to either accept a displayed amount or enter their own amount for increasing their credit using, in this example, a drop-down feature. It is to be appreciated and understood that the user interface can be configured to enable the user to authorize completion of the current session without necessarily pre-paying for subsequent sessions. Alternately or additionally, the user interface can be configured to enable the user to authorize completion of the current session as well as to pre-pay for additional subsequent sessions.

In addition, user interface window 606 includes two menu items 610 and 612. Menu item 610 enables the user to select an "auto-recharge" selection which, if selected, automatically adds credit to the user's account when the account drops below a pre-determined threshold. In addition, menu item 615 enables the user to agree to the "Terms of Service".

Once the user has decided upon a credit increase amount or entered any other relevant information, they may click the "Add Credit" button to finalize their transaction.

Notice that the user interface window 606 is presented on top of the content portion 604 through which the user engages in their communication session. Contemporaneously presenting the user interface window 606 during the pendency of the communication session enables the user experience to remain relatively undisturbed while the user selects to increase their credit. In addition, the other participants in the communication session are unaware of the transaction taking place with the user.

Having considered an example user interface in accordance with one or more embodiments, consider now a discussion of an example system that can be utilized to implement the described embodiments.

Example System

Figure 7:
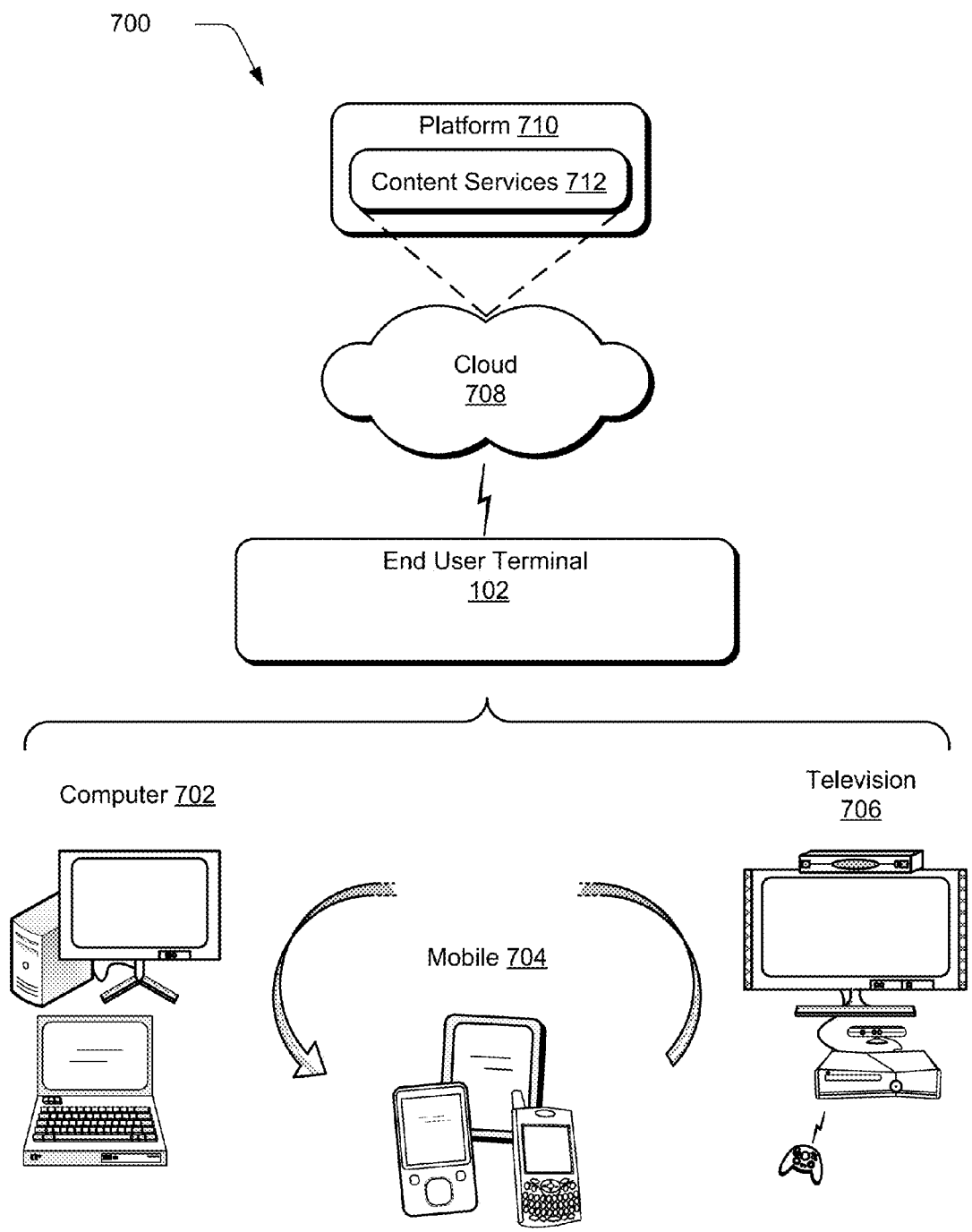
FIG. 7 illustrates an example system that includes the various end user terminals as described with reference to FIG. 1.

FIG. 7 illustrates an example system 700 that includes the end user terminal 102 as described with reference to FIG. 1. The example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that implement a service provider and/or charging gateway, as described above. These computers can be connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the end user terminal 102 may assume a variety of different configurations, such as for computer 702, mobile 704, and television 706 uses. Each of these configurations includes devices that may have generally different constructs and capabilities, and thus the end user terminal 102 may be configured according to one or more of the different device classes. For instance, the end user terminal 102 may be implemented as the computer 702 class of a device that includes a personal computer, desktop computer, a multi-screen computer, laptop computer, netbook, and so on. Each of these different configurations may employ the techniques described herein, through a suitably-configured client application which can serve to enable a user to make calls and/or participate in other communication sessions, as described above.

The end user terminal 102 may also be implemented as the mobile 704 class of device that includes mobile devices, such as a mobile phone, portable music player, portable gaming device, a tablet computer, a multi-screen computer, and so on. The end user terminal 102 may also be implemented as the television 706 class of device that includes devices having or connected to generally larger screens in casual viewing environments. These devices include televisions, set-top boxes, gaming consoles, and so on. The techniques described herein may be supported by these various configurations of the end user terminal 102 and are not limited to the specific examples the techniques described herein.

The cloud 708 includes and/or is representative of a platform 710 for content services 712. The platform 710 abstracts underlying functionality of hardware (e.g., servers) and software resources of the cloud 708. The content services 712 may include applications and/or data that can be utilized while computer processing is executed on servers that are remote from the end user terminal 102. Content services 712 can be provided as a service over the Internet and/or through a subscriber network, such as a cellular or Wi-Fi network.

The platform 710 may abstract resources and functions to connect the end user terminal 102 with other computing devices. The platform 710 may also serve to abstract scaling of resources to provide a corresponding level of scale to encountered demand for the content services 712 that are implemented via the platform 710. Accordingly, in an interconnected device embodiment, implementation of functionality described herein may be distributed throughout the system 700. For example, the functionality may be implemented in part on the end user terminal 102 as well as via the platform 710 that abstracts the functionality of the cloud 708.

CONCLUSION

Various embodiments provide a subscription management service, which can be in-band or out-of-band, which allows users to extend their subscription or temporarily side-step payment limits on a subscription without disrupting the user's experience. The various embodiments can be operable in all on-demand services including, but not limited to, video services, voice services, video/voice services, text services, Web services, and the like.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A computer-implemented method comprising:
   initiating, through a service provider and by way of a client application executing on a client device, a communication session over a communication network;
   monitoring, using the client application, a credit amount stored in a credit account associated with a user participating in the communication session;
   after determining that the user's credit is below a threshold:
      determining whether the user has permitted an automatic recharge;
      notifying the service provider to ascertain whether the user is capable of purchasing credit;
      receiving a response from the service provider that includes an indication that the user is permitted to authorize credit extensions; and,
      responsive to receiving the response from the service provider, and in response to a determination that the user has not permitted an automatic recharge, presenting a user interface, during the communication session, configured to enable the user to extend their credit and including a selectable option to permit automatic recharge;
   receiving, by way of the user interface, authorization to extend the user's credit; and
   sending the authorization to the service provider to cause the service provider to extend the user's credit such that the communication session continues without disruption over the communication network.

2. The computer-implemented method of claim 1, wherein the communication session comprises a voice over IP call.

3. The computer-implemented method of claim 1, wherein the communication session comprises an SMS session.

4. The computer-implemented method of claim 1, wherein the user interface comprises a user interface window presented within a user interface of the communication session.

5. The computer-implemented method of claim 1, wherein the user interface comprises a user interface window presented within a user interface of the communication session, and wherein the user interface window is configured to enable the user to enter an amount for increasing their credit.

6. The computer-implemented method of claim 1, wherein the user interface comprises a user interface window presented within a user interface of the communication session, and wherein the user interface window is configured to enable the user to authorize completion of the communication session without pre-paying for subsequent communication sessions.

7. The computer-implemented method of claim 1, wherein the user interface comprises a user interface window presented within a user interface of the communication session, and wherein the user interface window is configured to enable the user to authorize completion of the communication session and pre-pay for additional services.

8. The computer-implemented method of claim 1, wherein the user interface comprises a user interface window presented via a device other than the client device on which the user interface for the communication session is being presented, and wherein the user interface window is configured to enable the user to accept a displayed amount of credit.

9. One or more computer readable storage media comprising computer-executable instructions which, when executed, implement a client application configured to at least:
   initiate a voice over IP (VoIP) call over a communication network;
   monitor a credit amount stored in a credit account associated with a user participating in the VoIP call;
   determine whether the user has permitted an automatic recharge;
   notify a service provider to ascertain whether the user is capable of purchasing credit;
   receive a response from the service provider that includes an indication that the user is permitted to authorize credit extensions;
   responsive to receiving the response from the service provider, and in response to a determining that the user has not permitted an automatic recharge, present a user interface, during the VoIP call, configured to enable the user to extend their credit and including a selectable option to permit automatic recharge, responsive to their credit being below a threshold;
   receive, by way of the user interface, authorization to extend the user's credit; and
   send the authorization to the service provider associated with the VoIP call to cause the service provider to extend the user's credit such that the VoIP call continues without disruption over the communication network.

10. The one or more computer readable storage media of claim 9, wherein the client application is configured to enable the user to extend their credit to complete the VoIP call and not pre-pay for additional VoIP calls.

11. The one or more computer readable storage media of claim 9, wherein the client application is configured to enable the user to extend their credit to complete the VoIP call and pre-pay for additional VoIP calls.

12. The one or more computer readable storage media of claim 9, wherein the client application is configured to enable the user to extend their credit to complete the VoIP call and pre-pay for additional services.

13. The one or more computer readable storage media of claim 9, wherein the user interface comprises a user interface window presented within a user interface of the VoIP call.

14. The one or more computer readable storage media of claim 9, wherein the user interface comprises a user interface window presented within a user interface of the VoIP call, and wherein the user interface window is configured to enable the user to enter an amount for increasing their credit.

15. The one or more computer readable storage media of claim 9, wherein the user interface comprises a user interface window presented within a user interface of the VoIP call, and wherein the user interface window is configured to enable the user to accept a displayed amount of credit.

16. A system comprising:
   one or more processors; and
   one or more computer readable storage media comprising computer-executable instructions which, when executed by the one or more processors, implement:
      a user interface window configured to be presented during pendency of a user's communication session over a network to inform the user that their credit is about to expire, the user interface window presented in response to receiving a charging authorization and credit expiration announcement from a third party;
      a first menu item of the user interface window configured to enable the user to select an amount for increasing their credit such that the communication session continues without disruption over the network; and
      a second menu item of the user interface window configured to enable the user to select an auto-recharge selection which, if selected, automatically adds credit to the user's account when the account drops below a threshold by automatically notifying the third party to ascertain whether the user is capable of purchasing credit, receiving a response from the third party that includes an indication that the user is permitted to authorize credit extensions, and adding the credit to the user's account.

17. The system of claim 16, wherein the communication session comprises a VoIP session.

18. The system of claim 16, wherein the communication session comprises a session other than a VoIP session.

19. The system of claim 16, wherein the first menu item is configured to enable the user to accept a displayed amount.

20. The system of claim 16, wherein the first menu item is configured to enable the user to enter their own amount for increasing their credit.

* * * * *